United States Patent [19]

Uemura et al.

[11] Patent Number: 5,436,645
[45] Date of Patent: Jul. 25, 1995

[54] INSPECTION/ADJUSTMENT METHOD AND APPARATUS FOR LASER BEAM OUTPUT OPTICAL UNIT AND LASER SCANNING OPTICAL SYSTEM

[75] Inventors: Hideaki Uemura, Tokyo; Yozo Tobo, Yokohama; Fumio Ichikawa, Kamakura; Masatoshi Kato, Yokohama, all of Japan

[73] Assignee: Canon Kabushiki Kaisha, Tokyo, Japan

[21] Appl. No.: 84,625

[22] Filed: Jun. 30, 1993

[30] Foreign Application Priority Data

Jul. 1, 1992 [JP] Japan ................... 4-174378

[51] Int. Cl.⁶ ........................................ B41J 2/435
[52] U.S. Cl. ................................ 346/107; 372/31
[58] Field of Search ............... 346/108, 107 R, 76 L, 346/1.1, 160; 372/29, 31

[56] References Cited

U.S. PATENT DOCUMENTS

4,624,563 11/1986 Johnson .................. 359/369
4,786,154 11/1988 Fantone et al. ............ 356/365

*Primary Examiner*—Mark J. Reinhart
*Attorney, Agent, or Firm*—Fitzpatrick, Cella, Harper & Scinto

[57] ABSTRACT

There is disclosed a laser beam output optical unit adjustment method and apparatus, which can perform inspection and adjustment of a laser beam unit and a laser scanning optical system including this unit used in a laser beam printer within a short period of time. The laser irradiation position is roughly adjusted using a wide-field position detector, and focus rough adjustment is then performed using a narrow-field position detector. Thereafter, fine adjustment of the irradiation position and focus fine adjustment are performed using the narrow-field position detector. An image enhancement tube capable of a high-speed gate operation is arranged in a laser scanning region, and instantaneously takes a beam spot during laser scanning. An image processing devices analyzes the taken spot image, and a calculation unit calculates various data.

5 Claims, 12 Drawing Sheets

FIG. 9B $V = E(1-T/2)\cos \omega T$

INSPECTION/ADJUSTMENT METHOD AND APPARATUS FOR LASER BEAM OUTPUT OPTICAL UNIT AND LASER SCANNING OPTICAL SYSTEM

BACKGROUND OF THE INVENTION

Field of the Invention

The present invention relates to inspection/adjustment of a laser beam output optical unit and inspection of a laser scanning optical system, which are used in, e.g., a laser beam printer (LBP) which performs recording by scanning a laser beam modulated according to an image signal onto a photosensitive drum as a recording medium.

Related Background Art

In recent years, recording apparatuses such as a laser beam printer (LBP) for recording an image by scanning a laser beam have been widely used.

Figure 11:
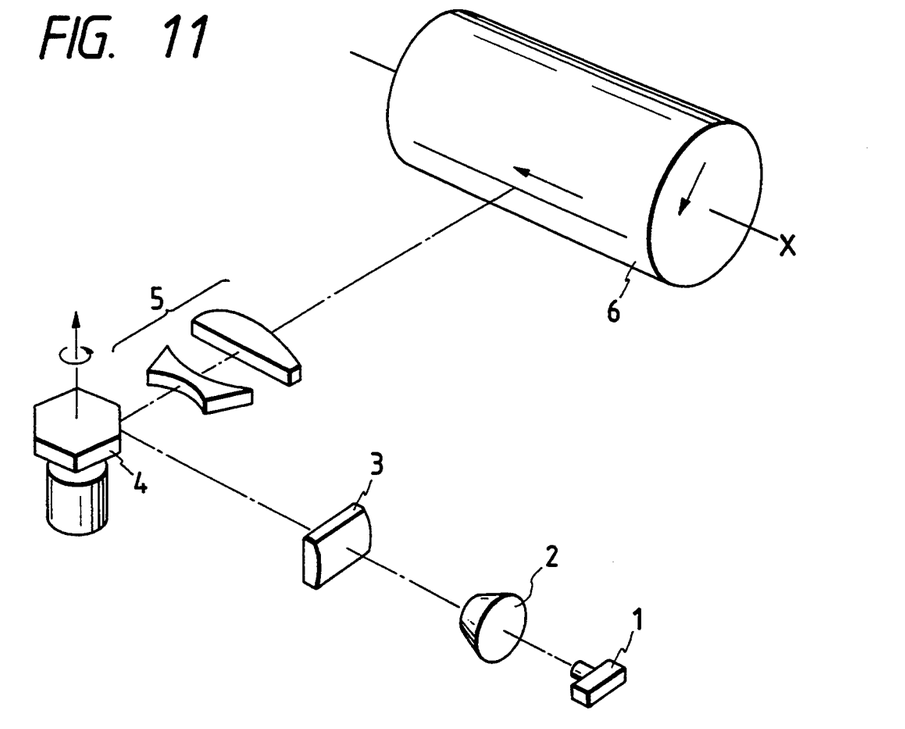
FIG. 11 is a schematic perspective view of a laser scanning optical system.

A laser scanning device used in an image recording apparatus will be described below with reference to FIG. 11. A semiconductor laser light source 1, a collimator lens 2, an imaging optical system 3, a polygonal mirror 4 as a deflector, an fθ lens 5, and a photosensitive drum 6 as a recording medium are arranged along an optical path. A laser beam emitted from the semiconductor laser light source 1 and modulated according to an image signal is collimated into parallel light by the collimator lens 2, and is then deflected by the polygonal mirror 4. The laser beam is imaged and scanned on the photosensitive drum 6 by the fθ lens 5.

Figure 12:
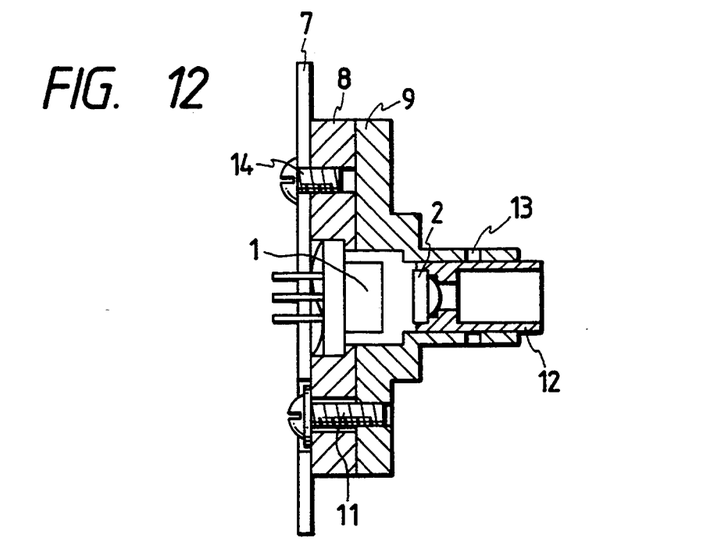
FIG. 12 is a sectional view of a laser unit.
Figure 13:
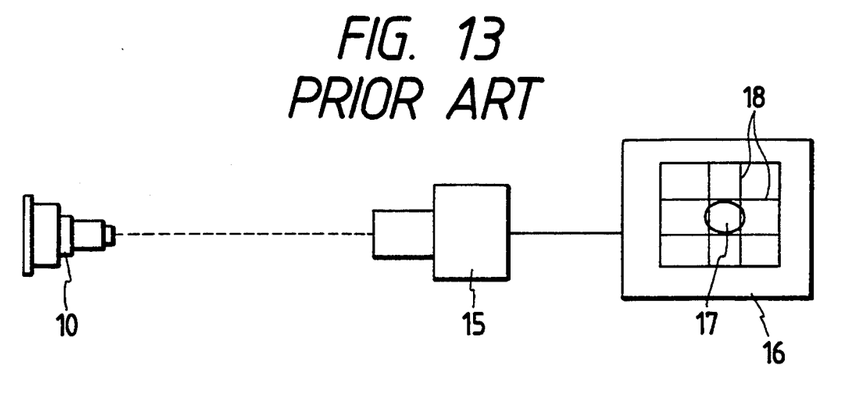
FIG. 13 is a schematic view showing conventional irradiation position adjustment.

In general, since light output from a semiconductor laser light source radially diverges from a light emission point, when such light source is used in, e.g., an LBP, a laser beam output optical unit for collimating the output light into parallel light using a collimator lens is normally used. FIG. 12 is a longitudinal sectional view of such laser beam output optical unit. A semiconductor laser light source 1 is fixed to a light emission control circuit board 7 by an adhesive. The circuit board 7 is fixed to a laser base 8 by a screw 14. The laser base 8 is fixed to a lens barrel holder 9 by a screw 11 after its position in the direction perpendicular to output light is adjusted. A lens barrel 12 for holding a collimator lens is subjected to focus adjustment in the direction parallel to output light, and is then fixed to the lens barrel holder 9 by an adhesive. Conventionally, position adjustment of the output light is performed as follows. That is, as shown in FIG. 13, the output light is detected by a TV camera 15, and the position of the laser base is manually adjusted, so that a spot image 17 of the output light falls within an adjustment range frame 18 while observing the image on a monitor 16. Thereafter, the laser base is fixed by a screw.

Upon inspection of the laser scanning optical system including the laser beam output optical unit, beam evaluation is normally performed by enlarging the beam using an objective lens, and executing image processing of an area sensor signal so as to measure a beam diameter. At this time, in a conventional method, a beam is stopped, and a polygonal mirror is externally controlled until a beam enters a measurement area. In order to measure a beam at a plurality of positions (normally, three positions), a plurality of measurement systems must be arranged.

Before adjustment of the laser beam output optical unit, the light emission point of the laser is normally shifted by ±0.2 mm to ±0.3 mm from an imaginary light emission point calculated from the outer diameter of the lens barrel, and the initial position of output light on the TV camera is shifted by ±4 mm to ±6 mm depending on the magnification of the collimator lens 2 and the magnification of the objective lens of the TV camera 15. In contrast to this, the TV camera has a view field as small as 2.5 mm$^2$ to improve measurement precision. Therefore, output light can hardly fall within the view field of the TV camera before adjustment, and adjustment must be started from an operation for causing the output light to fall within the view field of the TV camera. For this purpose, the position of the laser base is slowly moved in the direction perpendicular to the output light, so that laser light falls within the view field of the TV camera. Thereafter, fine adjustment is performed while observing the monitor 16. Such an operation requires a very long time period. When the laser base and the lens barrel holder are fixed by fastening a screw after adjustment, the position of the laser base is shifted upon final fastening of the screw, and re-adjustment must be performed, thus requiring another very long time period. The adjustment position may be initially shifted to compensate for an expected shift amount. However, such adjustment is performed by only a specialized person since a great deal of skills are required to determine the expected amount.

SUMMARY OF THE INVENTION

The present invention has been made in consideration of the above situation, and has as its object to provide an adjustment method for a laser beam output optical unit, which method can achieve adjustment with high precision in a short period of time.

In a method of stopping a beam upon inspection of the laser scanning optical system, the polygonal mirror must be precisely controlled to cause a beam to fall within the measurement area, resulting in a long inspection time (measurement range=0.4 mm$^2$).

When a measurement is performed at a plurality of positions, if a plurality of measurement systems are arranged, the apparatus becomes complicated. In this case, the measurement system may be moved to perform a measurement at an arbitrary position. However, control must wait until the measurement system stands still in units of points, resulting in a long inspection time.

The present invention provides an adjustment method for a laser beam output optical unit. In this method, a constant current is supplied to a laser beam output optical unit to emit a laser beam, and the laser irradiation position is roughly adjusted within a two-dimentionally predetermined range by a wide-field position sensor movable in a direction perpendicular to the laser beam. Then, focus rough adjustment is performed using a narrow-field position sensor which is arranged in advance at a position within the predetermined range and movable in the same direction as an axial direction of the laser beam. Thereafter, the laser power is measured, and the current supplied to the unit is adjusted so that an output of the laser becomes constant. In this state, fine adjustment of the laser irradiation position, and focus fine adjustment are performed using the narrow-field position sensor.

In the present invention, since an image enhancement tube capable of a high-speed gate operation (60 ns or shorter) is used in inspection of a laser scanning optical system, the beam can be evaluated in a scanning state, and the beam position can fall within a measurement area without detecting the rotational position of a polygonal mirror.

Figure 18:
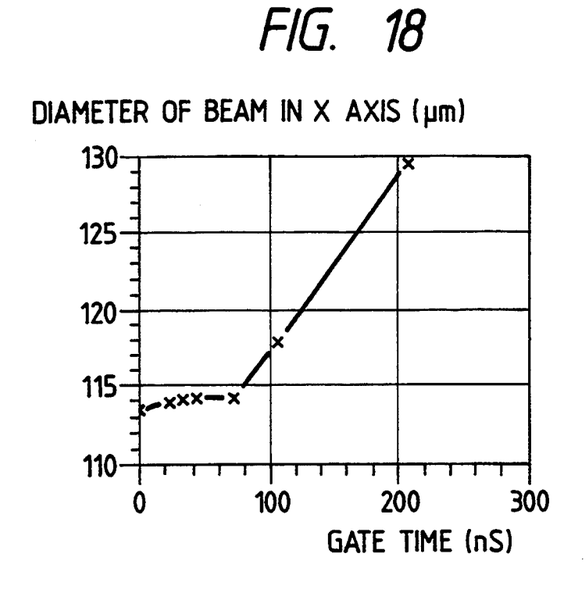
FIG. 18 is a graph showing the relationship between the gate time and the beam diameter in the X-axis at a certain scan speed.

At this time, when the laser scan speed is 200 m/s, the beam is moved by 4 μm for a gate time of 20 ns. FIG. 18 shows this measured value. As shown in FIG. 18, if the gate time is 60 ns or shorter, the beam diameter is left unchanged as compared to a still state. Since an image enhancement tube capable of a high-speed gate operation (60 ns or shorter) is used, this measurement system is arranged on a stage movable in the scanning direction of the beam, and the beam can be taken in this stage at a required position during beam scanning, thereby eliminating the influence of a mechanical vibration during movement. Therefore, one measurement system need only be used, and the apparatus can be simplified.

In inspection/adjustment of a laser beam output optical unit, the irradiation position of an output beam is roughly adjusted using a wide-field position sensor. Then, focus rough adjustment of the beam is performed using a narrow-field position sensor. Thereafter, the irradiation position and the focus position are finely adjusted.

In inspection of a laser scanning optical system, an image enhancement tube capable of a high-speed gate operation is arranged to be movable within a laser scanning region, and a beam spot is instantaneously taken during laser scanning, thus performing image processing of a spot image.

DETAILED DESCRIPTION OF THE PREFERRED EMBODIMENTS

The first embodiment of the present invention will be described below with reference to the accompanying drawings.

Figure 1:
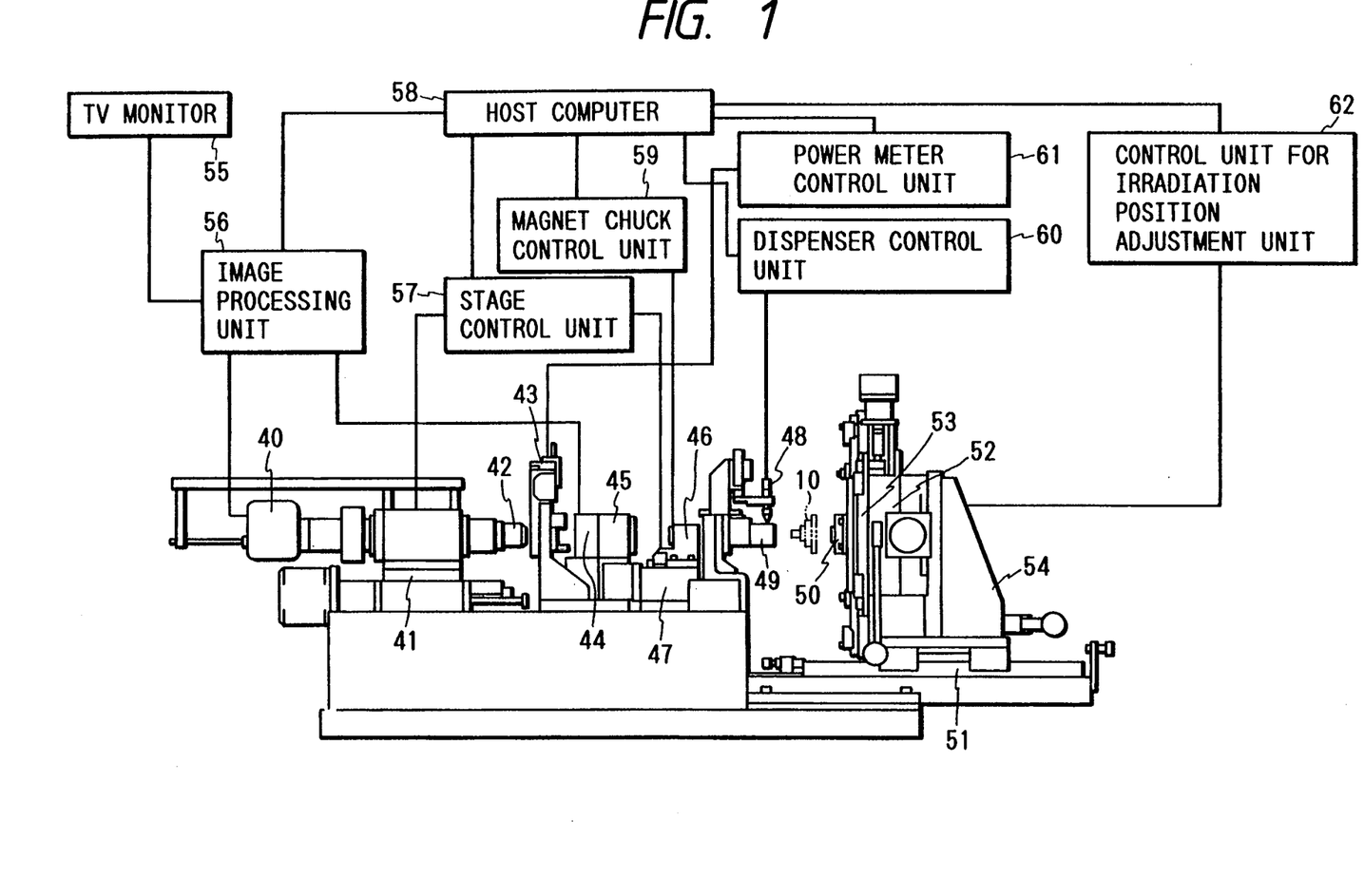
FIG. 1 is a side view showing the overall arrangement of a laser unit adjustment apparatus.
Figure 4:
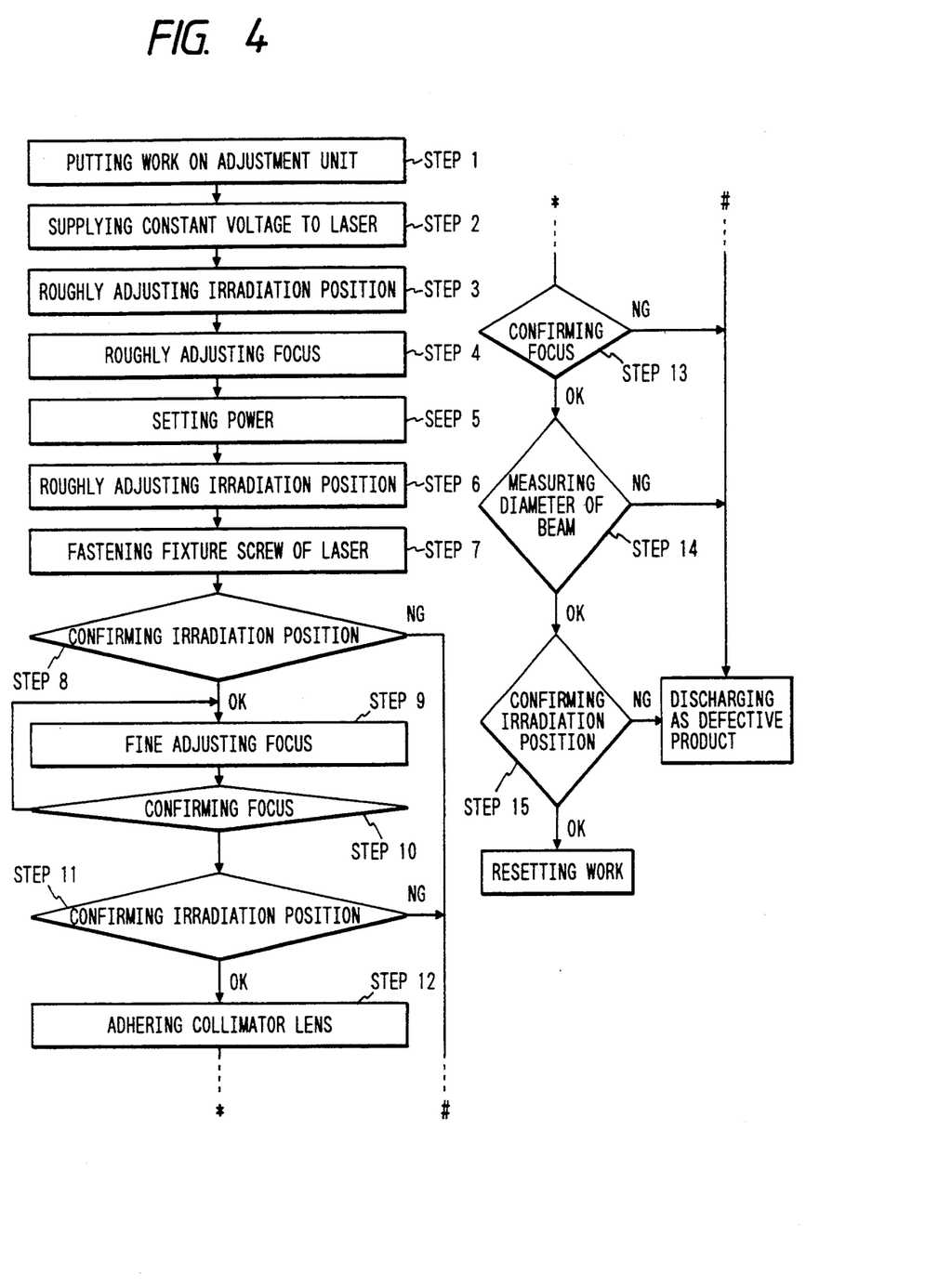
FIG. 4 is a flow chart showing adjustment processing of the laser unit adjustment apparatus.

FIG. 1 is a side view showing the overall arrangement of a laser output optical unit adjustment apparatus according to an embodiment of the present invention, and FIG. 4 is a flow chart showing adjustment processing.

The adjustment apparatus of this embodiment comprises a TV camera 40 comprising a narrow-field position sensor for laser irradiation position adjustment and focus adjustment, an X-axis stage 41 for moving the TV camera in the laser optical axis direction, an objective lens 42 for enlarging laser light, and guiding the enlarged light toward the TV camera, a tool lens 45 for converging laser light, a power checker unit 43 for measuring a laser power, a power checker control unit 61, a wide-field position sensor unit 44 for irradiation position rough adjustment, an image processing unit 56 for processing images from the position sensor unit and the TV camera 40, a TV monitor 55 for observing detected laser light and a processed image, a magnet chuck 46 for chucking a lens barrel of a collimator lens, a magnet chuck control unit 59, an X-axis stage 47 for moving a chuck unit, a stage control unit 57 for controlling the stages 41 and 47, an adhesive dispenser 48 for adhering the lens barrel and a lens barrel holder, a dispenser control unit 60, a holder unit 49 for butting and holding a work, a chuck unit 50 for clamping a laser base of a work, a Y-axis stage 52 for irradiation position adjustment, a Z-axis stage 53, a slider 51 for moving, in the X-axis direction, an irradiation position adjustment unit 54 consisting of the above-mentioned stages, the work chuck unit, a screw driver, a lens barrel holder pressing pin, a laser board contact pin, and the like, an irradiation position adjustment unit control unit 62 for controlling the irradiation position adjustment unit and the slider, and a host computer 58 for controlling the overall apparatus, and performing processing, calculation, and judgment.

Figure 2:
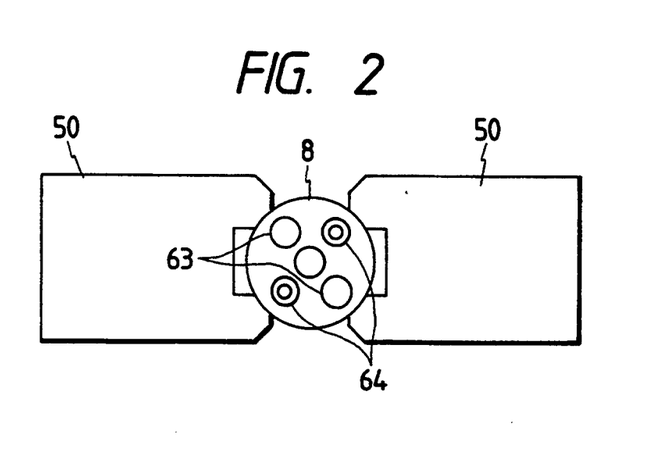
FIG. 2 is a plan view showing a chuck for a laser unit in the laser unit adjustment apparatus.

A work (laser output optical unit) is put at an intermediate position of the chuck 50 for clamping a work (step 1), and a laser base portion 8 is clamped from the two side surface sides, as shown in FIG. 2. The work clamp unit is moved by the X-axis slider 51. A lens barrel holder 9 is pressed against the work butting holder unit 49 by a lens barrel holder pressing pin 65 shown in FIG. 3 via holes of a laser board 7 and the laser base 8, so that the lens barrel holder is not moved even when the laser base 8 is adjusted in the Y and Z directions with respect to the lens barrel holder.

Figure 5:
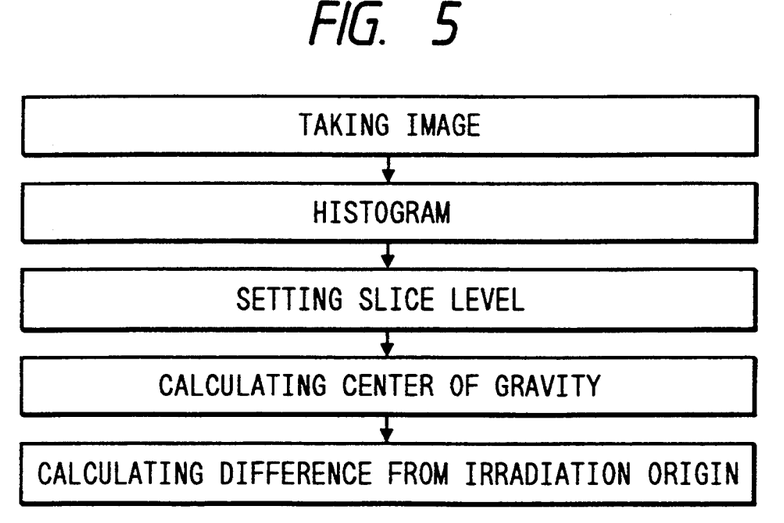
FIG. 5 is a flow chart showing image processing for obtaining the irradiation position of a beam.
Figure 6:
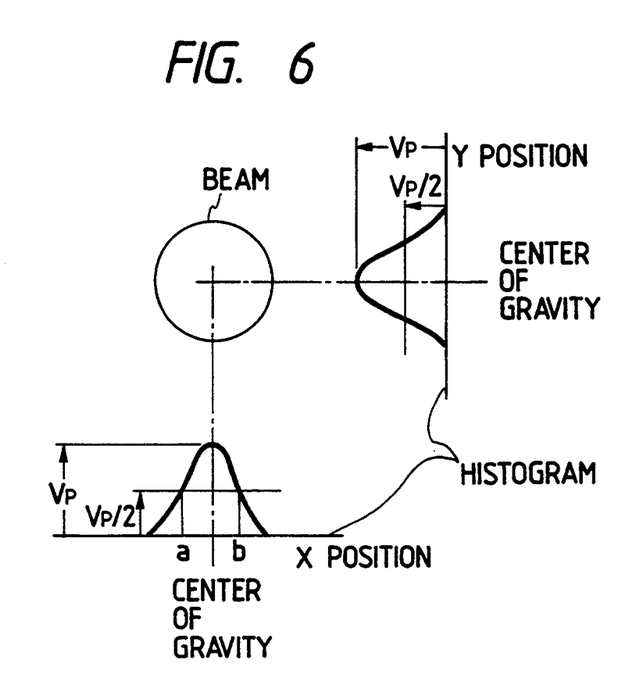
FIG. 6 is a diagram for explaining the relationship between the irradiation position of a beam and the beam output.
Figure 7:
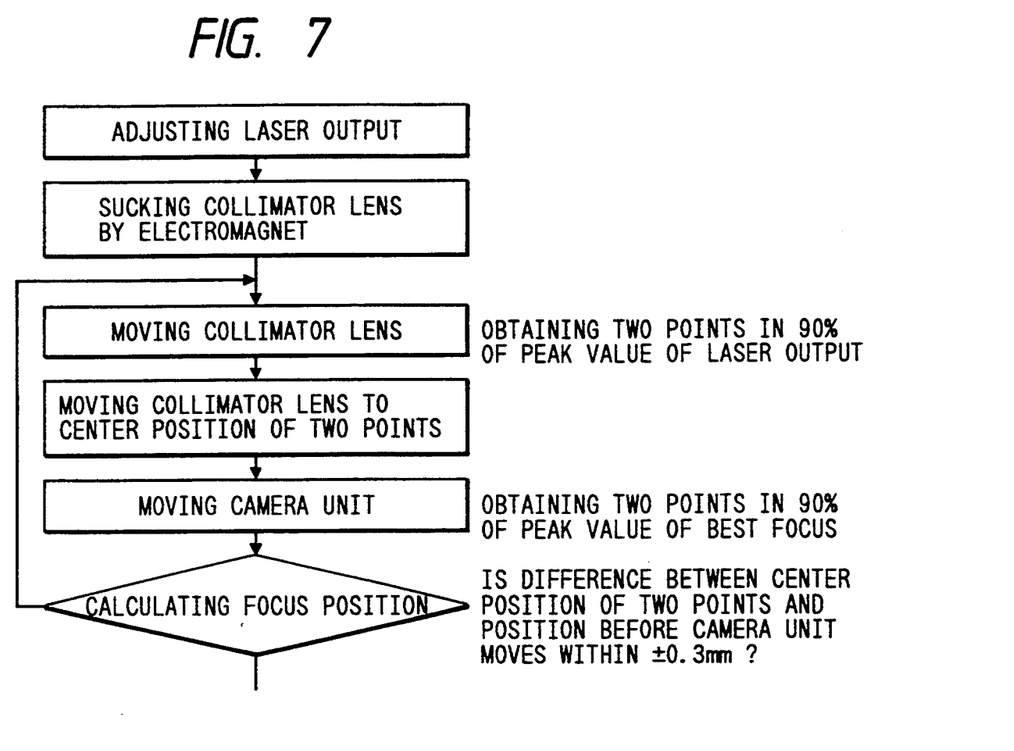
FIG. 7 is a flow chart showing focus adjustment processing.

A constant current is supplied to the laser board (step 2) to emit a laser beam. In this state, the irradiation position and the focus position are roughly adjusted. FIG. 5 is a flow chart showing image processing for measuring the irradiation position, and FIG. 6 is a view for explaining image processing of the irradiation position. A 45° mirror and the wide-field position sensor unit 44 are moved in the optical axis direction, so that the laser beam is radiated on the position sensor. At this time, although the predetermined constant current is supplied to the laser, the amount of the output laser beam is as small as about 1/5 (minimum) of a predetermined value in a certain work due to variations in characteristics of lasers. Since focus adjustment is not performed yet, the laser beam diameter is as large as about 10 times (maximum) of that in the best focus state. For this reason, the amount of light becomes 1/100 of the predetermined amount. Therefore, this irradiation position rough adjustment must be performed using a laser beam having an amount 1/500 of the predetermined value. Therefore, the position sensor to be used in this adjustment must assure a view field as wide as 10 mm×10 mm, and have high sensitivity and a wide dynamic range. A conventional CCD camera cannot be used since it has a narrow dynamic range. As the sensor satisfying this condition, a semiconductor position detector (PSD) is selected and used. Then, image processing of the taken laser beam is performed to form histograms of the sensor output in the X and Y directions, as shown in FIG. 6. A level ½ of a peak value Vp of each histogram is determined as a slice level, and the positions of centers of gravity in the X and Y directions of data exceeding the corresponding slice levels are calculated by the host computer using the following equation (1):

$$\text{Center of gravity} = \frac{\sum_{i=a}^{b} \{(Vi - Vp/2) \times i\}}{\sum_{i=a}^{b} (Vi - Vp/2)} \quad (1)$$

The Y-axis stage 52 and the Z-axis stage 53 of the adjustment apparatus are moved, so that the differences between the calculated positions of centers of gravity and the origin of the irradiation position become zero, thus ending rough adjustment of the irradiation position (step 3).

Figure 3:
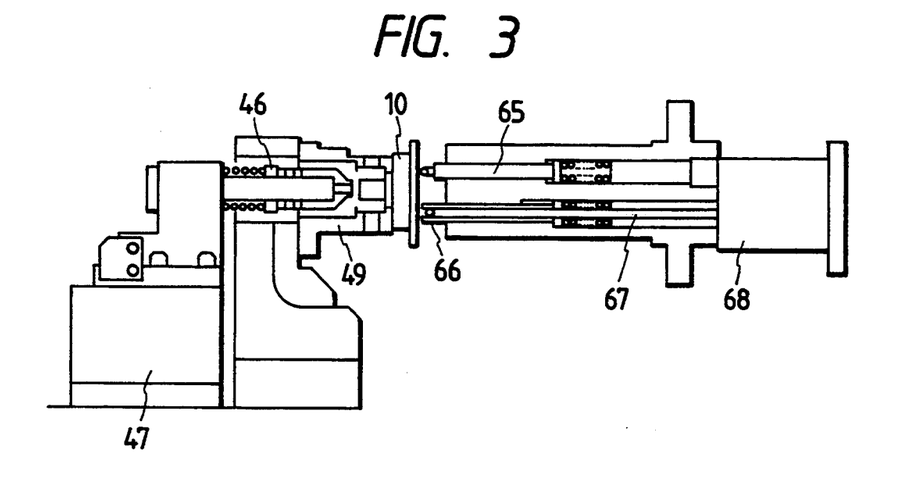
FIG. 3 is an enlarged sectional view showing main part of the laser unit adjustment apparatus.
Figure 8:
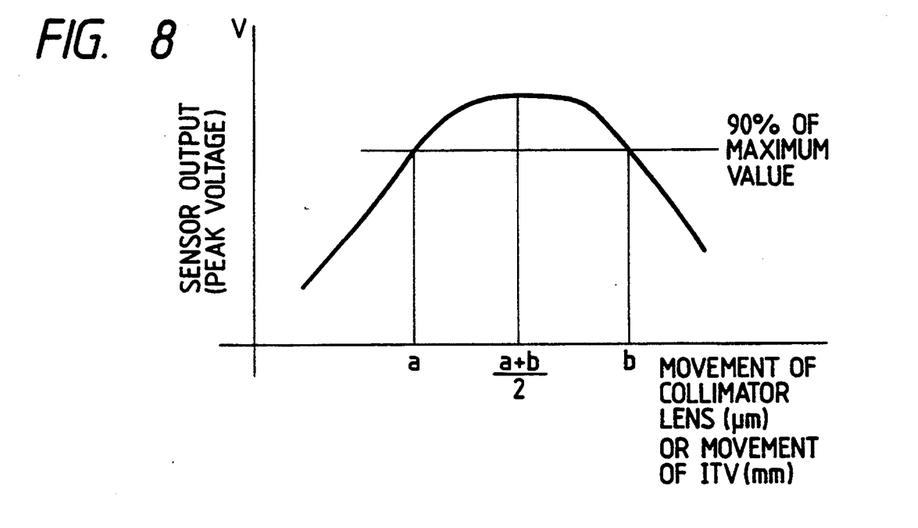
FIG. 8 is a graph showing the relationship between the focus position and the beam output value.

In focus rough adjustment, the 45° mirror and the wide-field position sensor unit 44 are laterally moved to fall outside the optical axis, so that the laser beam is radiated on an ITV (step 4). As shown in FIG. 3, the X-axis stage 47 for moving the magnet chuck is moved to an initial position, so that the magnet chuck 46 is butted against a work 14. The magnet chuck comprises an electromagnet, and chucks a lens barrel 12 when a current is supplied to the electromagnet. For this purpose, the lens barrel 12 consists of a metal or has a metal ring fitted in a contact surface between the lens barrel and the chuck. In the chucking state, the stage 47 is moved within a range of about ±0.6 mm near the best focus position estimated from the outer shape of the laser unit at a 10-μm pitch. During this movement, the ITV detects the peak value of a laser beam output value. FIG. 8 shows the relationship between the moving amount and the peak voltage. Positions a and b corresponding to 90% of the maximum value of the peak voltage are calculated, and the center point=(a+b)/2 is determined as the best focus position. Then, the lens barrel is moved to the position yielding this value.

The power checker unit 43 is set at the laser optical axis position to measure a laser power, and the amount of current to be supplied to the laser board is adjusted, so that the measured laser power has a predetermined value (step 5). Thereafter, the power checker unit is moved outside the optical axis, and the irradiation position is finely adjusted. In this fine adjustment (step 6), the laser beam is taken by the ITV camera, histograms are formed in the X and Y directions as in the rough adjustment to calculate the positions of centers of gravity, and the adjustment is performed, so that the differences between the calculated positions of centers of gravity and the origin of the irradiation position become zero. Then, while this value is held, a laser base pressing guide 66 (FIG. 3) is pressed against the laser base, and a laser base fixture screw 64 (FIG. 2) inserted in advance in the work 14 is fastened by a screw driver bit 67 (step 7), thus fixing the lens barrel holder and the laser base. The laser base pressing guide 66 pressurizes the laser base in the direction of the lens barrel holder upon fastening of the screw, thereby preventing the relative position between the laser base and the lens barrel holder from being shifted. In this state, the laser beam is taken by the ITV camera, and image processing and calculations of the centers of gravity are performed as in the rough adjustment, thereby confirming the irradiation position (step 8).

Figure 9A:
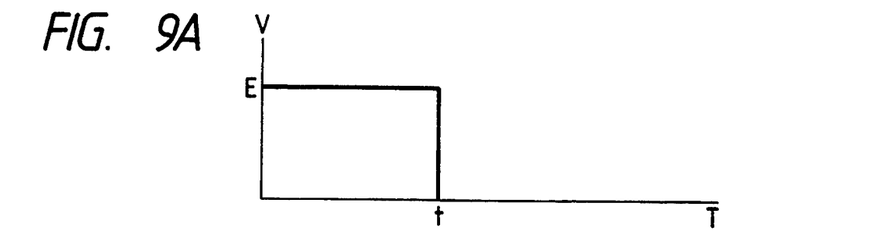
FIGS. 9A and 9B are graphs showing the voltage-time characteristics in an unclamp state of a magnet chuck.
Figure 9B:
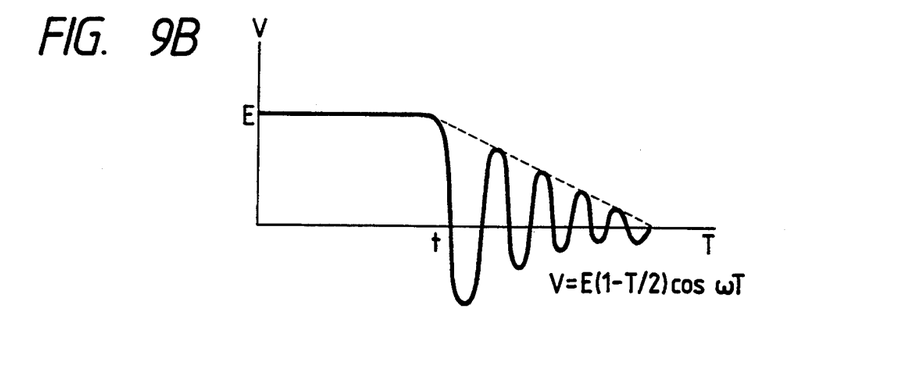
Figure 10:
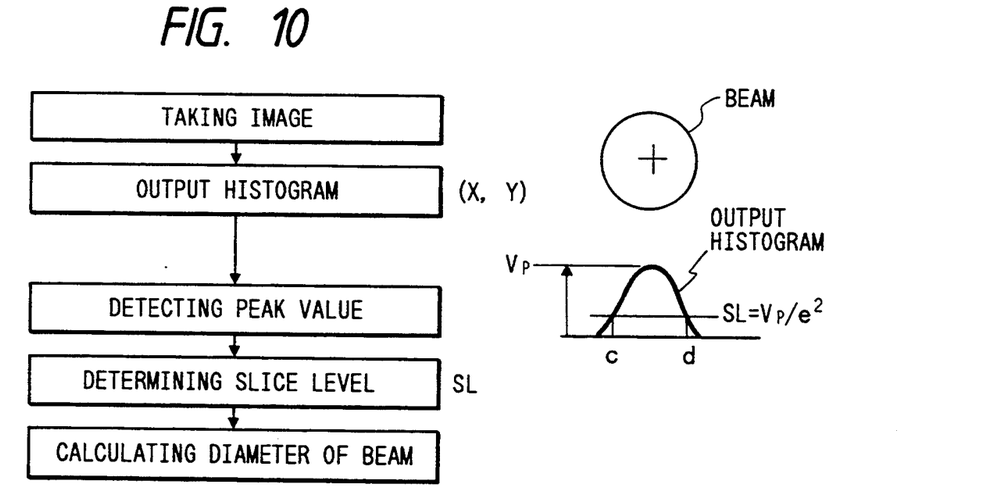
FIG. 10 is a flow chart showing laser beam diameter calculation processing, and a view for explaining the beam diameter calculation.

Then, focus fine adjustment (step 9) is performed. The stage 47 is moved at a 0.2-μm pitch within a range of about ±25 μm having, as the center, the best focus position detected in the focus rough adjustment, and the best focus position is calculated in the same manner as the rough adjustment. Then, the lens barrel is moved to the calculated position. In this state, the ITV camera unit is moved by the moving stage 41 by ±10 mm to have the camera position in the best focus state as the center, and the best focus position is calculated in the same manner as in the focus adjustment. It is then checked if the difference between the position before movement and the calculated position is equal to or smaller than 0.3 mm. If the difference exceeds 0.3 mm, the focus fine adjustment is repeated again. If OK is determined in focus confirmation (step 10), the irradiation position is confirmed in the same manner as described above (step 11). If OK is determined in step 11, the distal end of the adhesive dispenser 48 is inserted in an adhesive injection hole 13 (FIG. 12) of the work via a hole of the work butting holder unit 49, and an instantaneous adhesive is injected to adhere the lens barrel holder 9 and the lens barrel 12. After the work is left to stand for several seconds, the current supplied to the magnet chuck is stopped, and the stage 47 is moved to separate the lens barrel from the magnet chuck. In this case, a voltage applied to the magnet chuck is not stopped abruptly, as shown in FIG. 9A, but is gradually decreased to be converged in a predetermined period of time while alternately inverting the magnetic field in accordance with equation (2) below, as shown in FIG. 9B. In this manner, a phenomenon wherein a magnetic force remains in the lens barrel, the magnet chuck and the lens barrel cannot be separated from each other even when the voltage applied to the magnet chuck is stopped and the magnet chuck is moved, and the lens barrel is pulled by the magnet chuck, thus shifting the lens barrel position, is prevented.

$$V = E(1 - T/2) \cos \omega T \quad (2)$$

The focus position is confirmed again (step 13) in the same manner as described above, and a laser unit falling outside a rated range is discharged as a defective product. If OK is determined in step 13, the laser beam diameter is measured (step 14). As shown in FIG. 8, histograms of the output value are formed in both the X and Y directions on the basis of an image taken by the ITV camera in the same manner as the irradiation position, and their peak values are detected. A slice level SL is determined using equation (3) below on the basis of each peak value Vp, the number of pixels of the laser beam diameter is calculated from crossing points c and d between the slice level and each histogram, and the calculated value is multiplied with the resolution of the ITV camera to calculate the laser beam diameter.

$$SL = Vp/e^2 \quad (3)$$

The irradiation position is checked based on histogram data in the middle of the calculation of the beam diameter (step 15) to determine a good or defective product, thus ending the adjustment and manufacture of the laser output optical unit.

The second embodiment associated with inspection/adjustment of a laser scanning optical system using the above-mentioned laser unit will be described hereinafter.

A laser scanning optical system to be inspected/adjusted will now be described.

Figure 14:
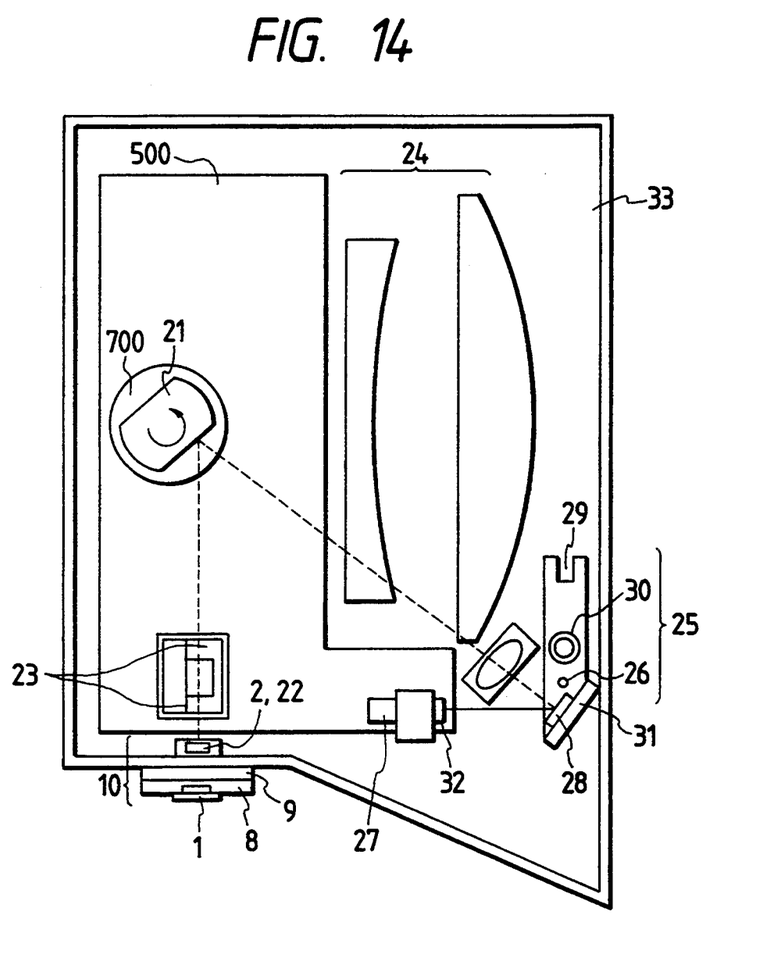
FIG. 14 is a schematic view showing an arrangement of a laser scanning optical system.

FIG. 14 is a schematic view showing an arrangement of a laser scanning optical system. A laser scanning optical system 20 comprises a laser unit 10, a polygonal mirror 21, coaxially having a rotational motor 700, for scanning a laser beam output from the laser unit 10, an imaging optical system having a cylindrical lens 22 arranged to focus a laser beam on the mirror 21 in a linear pattern in a direction perpendicular to the scanning direction of the mirror 21, and butting surfaces 23 along which the cylindrical lens 22 is moved parallel to the optical axis when the position of the lens 22 is adjusted, a lens system 24 for imaging a laser beam scanned by the rotating polygonal mirror 21 on a drum surface, converting the laser beam to an equal speed, and converting the beam position on the drum surface to a constant height upon rotation of the respective surfaces of the polygonal mirror 21, and a beam detector (to be abbreviated as BD hereinafter) mirror 25 and a BD sensor 27, which are arranged to measure the timing of a laser beam in front of a print area in a laser traveling range so as to correct rotation nonuniformity of the motor 700. For the sake of simplicity, the beam scanning direction will be referred to as an X-axis hereinafter, and an axis perpendicular to a plane defined by the beam scanning direction and the optical axis direction will be referred to as a Y-axis hereinafter. The BD mirror 25 comprises a mirror 28, which has a rotation pin 26 having a rotational shaft parallel to the rotational shaft of the motor 700, and reflects and deflects a laser beam toward the BD sensor 27, and an L-shaped base which is arranged with the pin 26 and the mirror 28, and has an adjustment slit 29 and a fixture screw hole 30. The BD sensor 27 has a lens 32 for focusing a laser beam reflected and deflected by the BD mirror 25, and a photodiode which is arranged on a focal plane of the focused laser beam, and can measure the laser scanning timing. Also, the laser scanning optical system has a circuit board 500 for controlling the above-mentioned components and amplifying their outputs, and an optical box 33 in which the above-mentioned components are fixed by screws or an adhesive, and which has a plurality of reference holes for mounting.

The second embodiment of the present invention will be described below.

Figure 15:
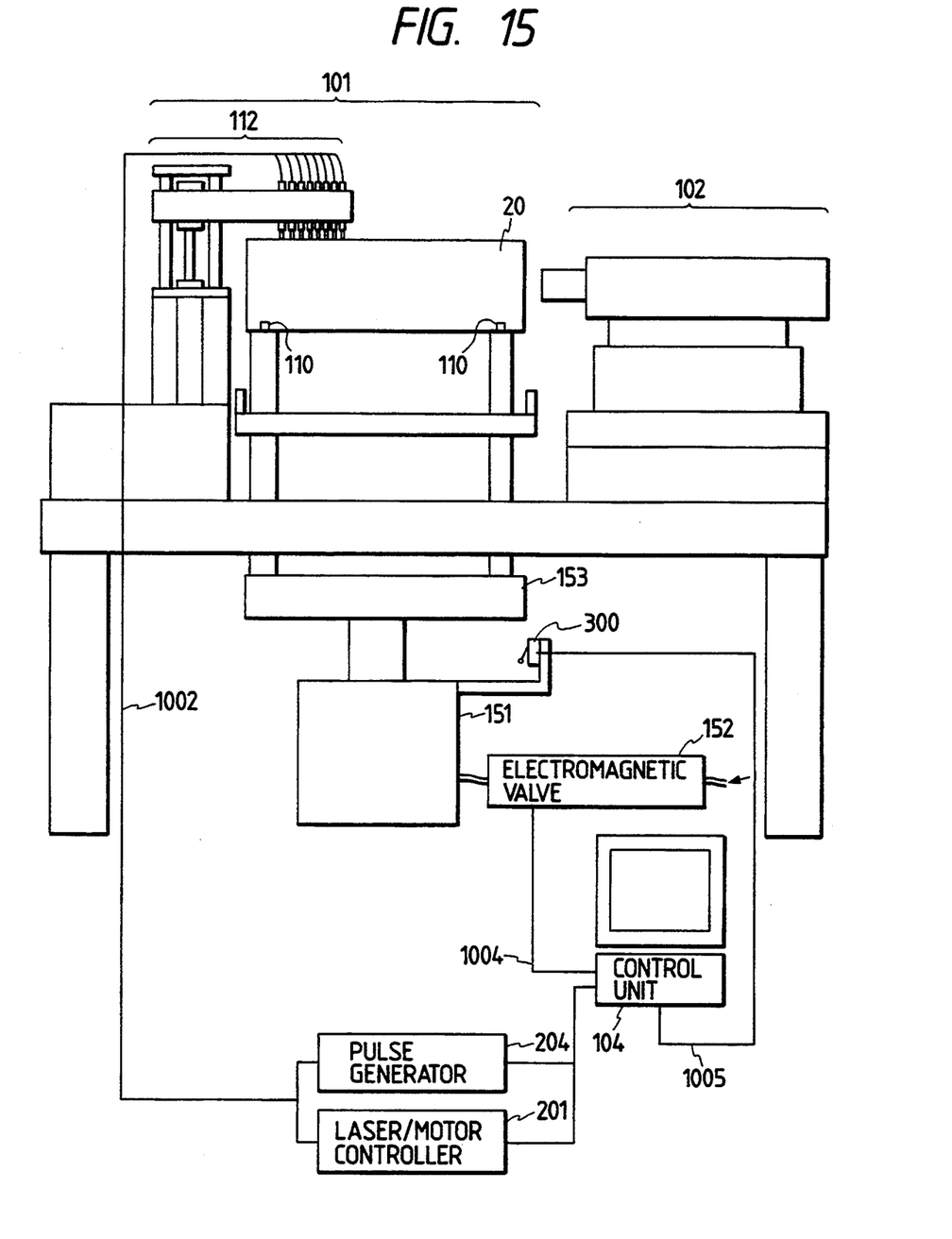
FIG. 15 is a schematic view showing an arrangement of an inspection apparatus (mainly showing a jig) of the laser scanning optical system according to the present invention.

FIG. 15 is a schematic view showing the overall arrangement of this embodiment. An inspection apparatus comprises a jig 101 having mechanisms for clamping a laser scanning optical system (to be referred to as a work 20 hereinafter) to be inspected/adjusted, supplying a power supply voltage, and performing adjustment, a measurement system 102 which is scanned with a beam, and is moved along a line imaged by the beam as measurement points, a pulse generator 204 for measuring the beam scanning timing, and supplying a measurement timing signal to the measurement system via a cable, and a control unit 104 for controlling the jig 101, the measurement system 102, and the pulse generator 204.

The jig 101 has a mechanism 110 which has a plurality of pins to be inserted in positioning holes of the work 20, and a surface for providing steps to the pins to regulate the height direction of the work so as to position the work 20, a clamp mechanism (not shown) for clamping and fixing the work 20 from positions above the positioning pins, an escaping mechanism 151, and a probe unit 112 for electrically contacting a plurality of arbitrary positions on the circuit board 500 (FIG. 14) on the work 20. The probe unit 112 connects a power supply voltage necessary for the work 20, a motor control signal, a laser control signal, a BD signal obtained by amplifying the output from the BD sensor 27 on the work 20, and the like to a laser motor controller 201 and the pulse generator 204 via cables 1004 by bringing probes into contact with the circuit board.

Figure 16:
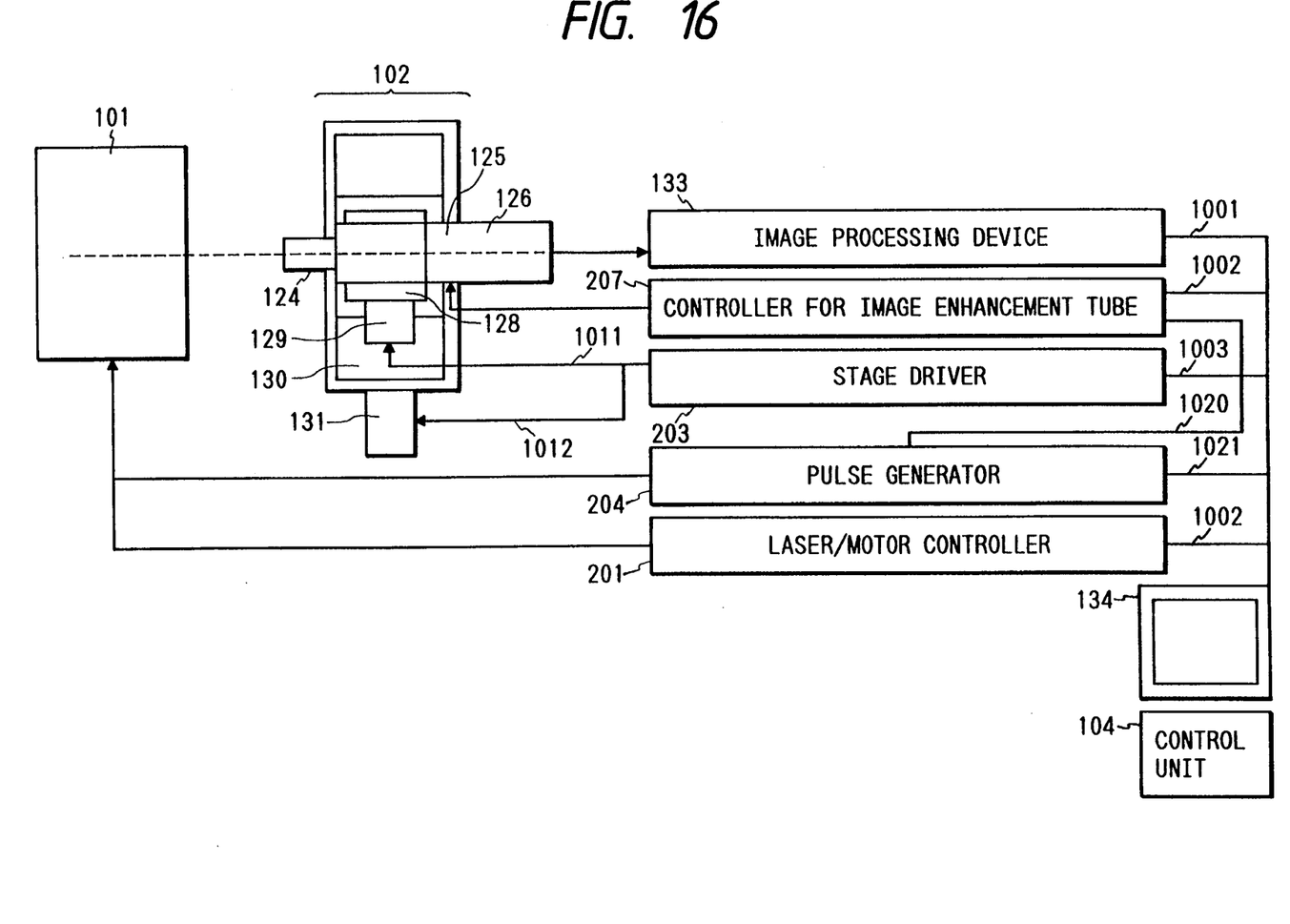
FIG. 16 is a schematic view showing the arrangement of the inspection apparatus (mainly showing a measurement system) of the laser scanning optical system according to the present invention.

As shown in FIG. 16, the measurement system 102 comprises a measurement optical system including a x20 objective lens 124, an image enhancement tube 125, capable of a high-speed gate operation, for instantaneously taking a laser beam, an area sensor 126, a fiber (not shown) for connecting the image enhancement tube 125 capable of a high-speed gate operation and the area sensor, and a lens barrel in which the above-mentioned components are aligned along the optical axis. The measurement system 102 also comprises two stages 128 and 130 for, when the control unit 104 controls a stage driver via a cable, moving the measurement optical system in the scanning and height directions of a beam, and an image processing device 133 for calculating the beam position and the beam diameter of a beam image output from the area sensor 126. The image processing device supplies the calculated result to the control unit 104 via a cable 1001.

Figure 17:
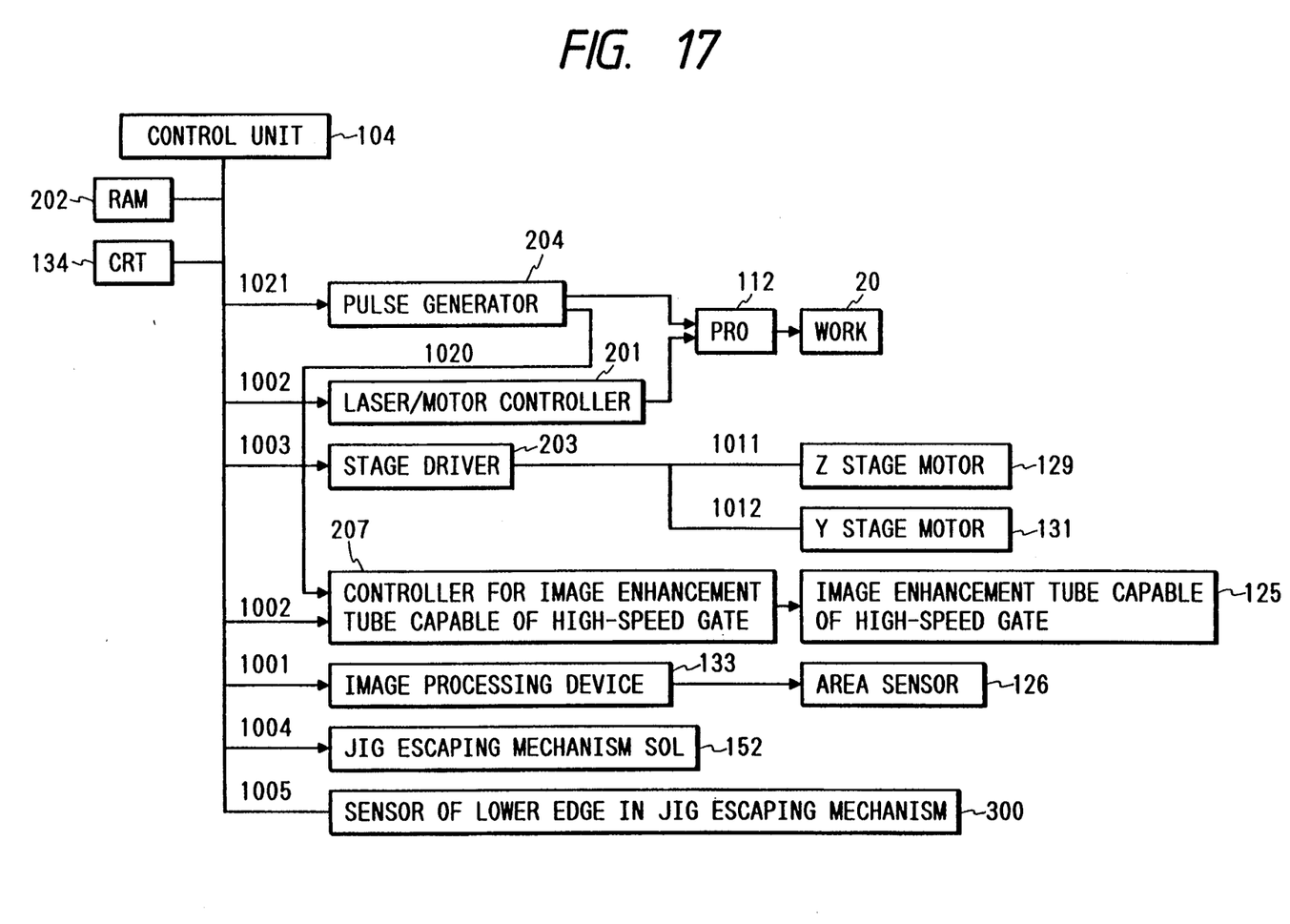
FIG. 17 is a block diagram showing the overall arrangement of the inspection apparatus of the laser scanning optical system according to the present invention.
Figure 19:
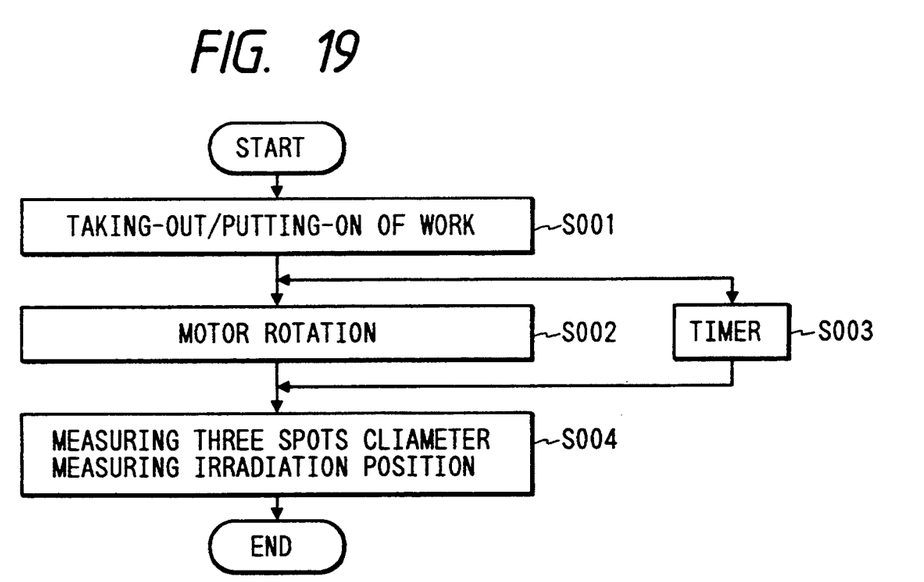
FIG. 19 is a schematic flow chart showing an operation sequence of the inspection apparatus of the laser scanning optical system according to the present invention.

The operation of this apparatus (FIG. 17) will be described below with reference to FIG. 19.

The work 20 is taken out, and is put on the predetermined position (S001). When a start SW (not shown) on the control unit 104 is depressed, the apparatus operates in the following sequence. The control unit 104 enables a solenoid valve 152 via the cables 1004 to drive an air solenoid of the escaping mechanism 151. Thus, a positioning jig 153 is moved upward, and the work 20 is connected to the contact pins. Thereafter, the control unit 104 supplies a power supply voltage to the work 20 via cables 1002, and enables a motor rotation signal to supply a motor rotation instruction via the cables 1002 (S002). The control waits until the rotation of the motor is stabilized. Thereafter, when the control unit 104 enables a laser power ON signal via the cables 1002, a laser beam emits with a preset laser power from the work 20. Simultaneously with the instruction supplied in step S002, a timer starts counting in step S003. After an elapse of a predetermined period of time, the control unit 104 drives a motor 131 via a cable 1012 to move the stage 130 outside the print region, and then issues an instruction for measuring the central position and diameter of the beam to the image processing device 133 (step S004). Thereafter, the control unit 104 drives the motor 131 via the cable 1012 to move the stage 130 to a certain measurement position in the print area in step S004. The motor 131 is connected to an encoder (not shown), which outputs pulses in synchronism with rotation of the motor 131. A driver 203 of the motor outputs a coincidence signal via a cable 1003 when the count value of the encoder (not shown) in the driver reaches a setting value corresponding to the measurement position input in advance from the control unit 104 via the cable 1003. This coincidence signal is supplied to the control unit 104. In response to this signal, the control unit 104 issues an image taking instruction to the image processing device 133 via the cable 1001. Upon reception of this instruction, the image processing device 133 takes an image, executes a processing content (measurement of the beam diameter and central position, and the like) instructed by the control unit 104 via the cable, and supplies the execution result to the control unit 104 via the cable. The control unit 104 stores the received value in a RAM 202. Upon reception of the execution result, the control unit 104 supplies an encoder count value of the next measurement position to the motor driver 203 via the cable 1003. Such processing is repeated at a plurality of measurement positions (currently, three positions), and all measured results are stored in the RAM 202.

Assume that data to be stored is $(Y, W_X, W_Y)$, Y is the beam position in the Y direction, $W_X$ is the beam diameter in the X direction, and $W_Y$ is the beam diameter in the Y direction. If the first measured result is represented by $(Y1, W_X1, W_Y1)$, the second measured result is represented by $(Y2, W_X2, W_Y2)$, and the third measured result is represented by $(Y3, W_X3, W_Y3)$, the irradiation position is given by $(Y1+Y2+Y3)/3$, the inclination is given by $(Y1-Y3)$, the curvature is given by $(Y2-(Y1+Y3)/2)$, and the beam diameters are respectively represented by $(W_X1, W_Y1)$, $(W_X2, W_Y2)$, and $(W_X3, W_Y3)$. Thus, the taken beam image is analyzed by the image processing device, and the above-mentioned calculations are performed by the control unit 104.

The driver of the motor supplies a signal indicating that the movement of the stage 130 is completed to the control unit 104 via the cable. Upon reception of this signal, the control unit 104 supplies an OFF signal to the solenoid valve 152. As a result, the air solenoid is moved in a direction to move the jig 153 downward, and the work 20 is moved downward. When a lower edge sensor 300 is turned on, the measured results are displayed, and the control unit compares the results and rated values stored in the RAM 202, thus performing an OK/NG display on a monitor 134.

The image processing in the image processing device is performed for the following contents.

First, a dark level is obtained.

Taken image data is stored at memory addresses corresponding to pixel positions as pixel information obtained by converting a video signal into digital data. In this memory, 640 pixels × 480 pixels are aligned in the X and Y directions, and an average value of 250 pixels around the center of this pixel matrix is used as a dark level. This processing is performed in only a startup state of the apparatus while the gate of the image enhancement tube capable of a high-speed gate operation is closed: $V_{dark}$ $$Dark\ level = (\Sigma\Sigma V_{ij})/(i \times j)$$

$V_{dark}$ is used in the following processing.

Then, center of gravity processing is performed. The following processing is performed in units of measurement positions.

A peak value in the entire image is searched: $V_{peak}$ $$Slice\ level\ Vs = (V_{peak} - V_{dark})/e^2 + V_{dark}$$

If $V_{ij} - Vs < 0$, 0 is set; if $V_{ij} - Vs > 0$, $V_{ij} - Vs$ is set.

$$\text{Center of gravity } cx = \sum_i \sum_j \{(V_{ij} - Vs) \times i\} / \sum_i \sum_j (V_{ij} - Vs)$$

$$\text{Center of gravity } cy = \sum_i \sum_j \{(V_{ij} - Vs) \times j\} / \sum_i \sum_j (V_{ij} - Vs)$$

The control unit multiplies these centers of gravity cx and cy with a magnification per pixel pre-stored in the RAM to determine beam positions (X, Y).

Finally, a beam diameter is obtained.

A beam diameter (pixels) Wgy in the Y direction is defined as the number of pixels exceeding the slice level Vs in data of a line (Vcx, j) (j=0 to 479) of the center of gravity cx. A beam diameter (pixels) Wgx in the X direction is defined as the number of pixels exceeding the slice level Vs in data of a line (Vi, cy) (i=0 to 639) of the center of Gravity cy. The control unit multiplies these number of pixels with a magnification per pixel pre-stored in the RAM to determine beam diameters (Wx, Wy).

As described above, according to the present invention, the irradiation position of a laser beam is detected by a position sensor (PSD) having a wide taking area and a wide measurement dynamic range, and rough adjustment is performed to cause the laser beam to fall within the measurement area of a TV camera. Thereafter, fine adjustment is performed using a TV camera attached with an objective lens and having a high measurement resolution. For this reason, a very long try & error time is not required regardless of the irradiation position of a laser beam before adjustment, and a laser base can be prevented from being shifted by fastening since the laser base is pressurized in the same direction as the fastening direction upon fastening of screws after adjustment, thus requiring no re-adjustment. Therefore, the adjustment time upon assembling of the laser output optical unit can be Greatly shortened.

Furthermore, in inspection upon assembling of a laser scanning system including the laser output optical unit, since an image enhancement tube capable of a high-speed gate operation is movably arranged in the scanning region of a laser beam, a beam can be taken at a required position in a beam scanning state without detecting the rotational position of a polygonal mirror. Therefore, the arrangement of the apparatus can be prevented from being complicated, and the inspection time can be shortened.

What is claimed is:

1. A method of adjusting a laser beam output optical unit in an assembling process of the laser beam output optical unit, said method comprising the steps of:

emitting a laser beam by supplying a constant current to said unit;

adjusting roughly a laser irradiation position within a two-dimensional predetermined range using a wide-field position sensor movable in a direction perpendicular to the laser beam;

performing rough focus adjustment using a narrow-field position sensor which is arranged in advance at a position within the predetermined range and movable in the same direction as an axial direction of the laser beam;

measuring a power of the laser beam;

adjusting the current supplied to the unit so that an output of the laser becomes constant; and performing fine adjustment of the laser irradiation position and fine focus adjustment in this state using said narrow-field position sensor.

2. A method according to claim 1, wherein said wide-field position sensor comprises a semiconductor position detector.

3. A method according to claim 1, wherein a lens barrel holder and a laser base are fixed by fastening a screw after the fine adjustment of the laser irradiation position in such a manner that said laser base is pressed against said lens barrel holder by a pressurizing mechanism in the same direction as the screw fastening direction, and thereafter, the screw is fastened.

4. A method of inspecting a laser scanning optical system upon assembling of the laser scanning optical system of a laser beam printer said method comprising the steps of:

moving an image enhancement tube capable of a high-speed gate operation to an arbitrary inspection position within a beam scanning region;

taking a beam image of a beam being scanned by a scanning timing signal at an inspection position to the image enhancement tube; and obtaining inspection data by image processing and calculation processing of the taken beam image.

5. An inspection apparatus for a laser scanning optical system, comprising:

a measurement unit arranged on a stage which is moved to an arbitrary position in a beam scanning region scanned by a laser scanning optical system in an inspection process upon assembling of said laser scanning optical system of a laser beam printer, and including an image enhancement tube capable of a high-speed gate operation and an objective lens, and an area sensor;

an image processing unit for performing image processing of an output from said area sensor;

a pulse generating unit for generating a pulse after an elapse of a scanning timing time corresponding to the position of said stage from an output of a beam detector attached to said laser scanning optical system, and controlling said image enhancement tube by the pulse;

a display unit for displaying an image processing result; and a calculation control unit for controlling said each unit.

* * * * *